(12) United States Patent
Prasad et al.

(10) Patent No.: US 10,414,930 B2
(45) Date of Patent: Sep. 17, 2019

(54) MAGENTA INKS

(71) Applicant: Hewlett-Packard Development Company, L.P., Houston, TX (US)

(72) Inventors: Keshava A. Prasad, San Marcos, CA (US); Dennis Z. Guo, San Diego, CA (US); Niamh Kelly, Dublin (IE); Kenneth Hickey, Dublin (IE); Kevin Rattigan, Leixlip (IE); Claire Harley, Leixlip (IE)

(73) Assignee: Hewlett-Packard Development Company, L.P., Spring, TX (US)

( * ) Notice: Subject to any disclaimer, the term of this patent is extended or adjusted under 35 U.S.C. 154(b) by 403 days.

(21) Appl. No.: 15/039,410

(22) PCT Filed: Jan. 10, 2014

(86) PCT No.: PCT/US2014/011082
§ 371 (c)(1),
(2) Date: May 25, 2016

(87) PCT Pub. No.: WO2015/105503
PCT Pub. Date: Jul. 16, 2015

(65) Prior Publication Data
US 2017/0022383 A1    Jan. 26, 2017

(51) Int. Cl.
| C09D 11/322 | (2014.01) |
| B41J 2/01 | (2006.01) |
| C09D 11/38 | (2014.01) |
| C09D 11/102 | (2014.01) |
| C09D 11/40 | (2014.01) |
| C09B 29/15 | (2006.01) |
| C09B 48/00 | (2006.01) |

(52) U.S. Cl.
CPC .............. C09D 11/322 (2013.01); B41J 2/01 (2013.01); C09B 29/103 (2013.01); C09B 48/00 (2013.01); C09D 11/102 (2013.01); C09D 11/38 (2013.01); C09D 11/40 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| 7,008,475 | B2 | 3/2006 | Randler et al. |
| 7,399,351 | B2 | 7/2008 | Jackson et al. |
| 7,854,798 | B2 | 12/2010 | Udagawa et al. |
| 7,922,807 | B2 | 4/2011 | Teshima et al. |
| 8,573,762 | B1 * | 11/2013 | Prasad ................ C09D 11/102 347/100 |
| 10,047,233 | B2 * | 8/2018 | Deardurff ............. C09D 11/38 |
| 2003/0019398 | A1 | 1/2003 | Komatsu et al. |
| 2004/0061754 | A1 * | 4/2004 | Chen .................... B41J 2/42 347/100 |

(Continued)

FOREIGN PATENT DOCUMENTS

| JP | 2001002962 | 1/2001 | |
| JP | 2003140396 | 5/2003 | |
| JP | 2006057044 A * | 3/2006 | ............. C09D 11/00 |
| JP | 2011149015 | 8/2011 | |
| JP | 2013088482 | 5/2013 | |
| JP | 2013182059 | 9/2013 | |

OTHER PUBLICATIONS

International Search Report and Written Opinion for International Application No. PCT/US2014/011082 dated Oct. 8, 2014, 11 pages.

(Continued)

*Primary Examiner* — Manish S Shah
(74) *Attorney, Agent, or Firm* — Dierker & Kavanaugh PC

(57) ABSTRACT

The present disclosure relates to magenta inkjet inks having a quinacridone pigment and an azo pigment. The azo pigment has at least one azo compound having the formula (I), in which $R_a$ is selected from H, aryl and $C_1$ to $C_4$ alkyl, and $R_b$, $R_c$ and $R_d$ are each independently selected from H, a $C_1$ to $C_4$ alkyl, an oxygen-containing, a nitrogen-containing and a sulphur-containing functional group. Where $R_a$ is aryl, the aryl is not a phenyl group having at least one hydrogen atom that has been substituted with a chlorine atom.

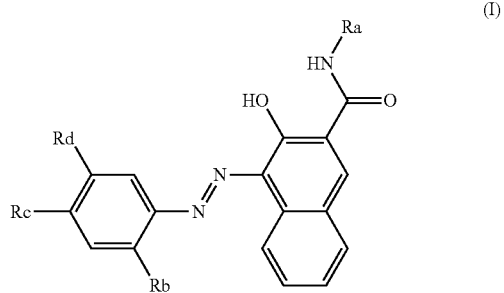

18 Claims, No Drawings

(56) References Cited

U.S. PATENT DOCUMENTS

| | | |
|---|---|---|
| 2005/0008960 A1 | 1/2005 | Yaguchi et al. |
| 2005/0150421 A1 | 7/2005 | Sawada et al. |
| 2006/0046178 A1 | 3/2006 | Akiyama et al. |
| 2008/0207820 A1* | 8/2008 | Brust .................. C09D 11/322 524/507 |
| 2011/0030580 A1 | 2/2011 | Jackson et al. |
| 2011/0160358 A1 | 6/2011 | Arai et al. |
| 2012/0200650 A1 | 8/2012 | Deroover |
| 2012/0229555 A1 | 9/2012 | Deroover |
| 2013/0307914 A1* | 11/2013 | Chen ..................... B41J 2/2107 347/100 |

OTHER PUBLICATIONS

The Extended European Search Report for International Application No. PCT/US2014/011082 dated Oct. 19, 2016, 6 pages.

* cited by examiner

MAGENTA INKS

BACKGROUND

Inkjet printing systems are used as an effective way of producing images on a print medium, such as paper. An inkjet ink set may be used as an ink source for the inkjet printing system. For example, an inkjet ink set may include cyan, magenta and yellow ink. Ink droplets formed from one or more of the inks of the inkjet ink set are ejected from a nozzle onto a substrate to produce an image on the print medium.

DESCRIPTION

Before particular examples of the present disclosure are disclosed and described, it is to be understood that the present disclosure is not limited to the particular inks and ink sets disclosed herein. It is also to be understood that the terminology used herein is used for describing particular examples only and is not intended to be limiting, as the scope of protection will be defined by the claims and equivalents thereof.

In describing and claiming the devices, systems and methods, the following terminology will be used: the singular forms "a", "an", and "the" include the plural unless the context clearly dictates otherwise. Thus, for example, reference to "a pigment" includes reference to one or more pigments.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 weight % to about 20 weight % should be interpreted to include not only the explicitly recited concentration limits of about 1 weight % to about 20 weight %, but also to include individual concentrations such as 2 weight %, 3 weight %, 4 weight %, and sub-ranges such as 5 weight % to 15 weight %, 10 weight % to 20 weight %, etc. All percentages are by weight (wt %) unless otherwise indicated.

The present disclosure relates to a magenta inkjet ink comprising a quinacridone pigment and an azo pigment. The azo pigment comprises at least one azo compound having the formula (I):

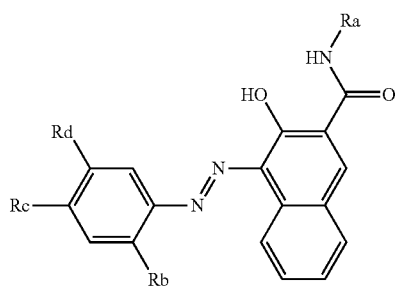

(I)

in which $R_a$ is selected from H, aryl and $C_1$ to $C_4$ alkyl, and $R_b$, $R_c$ and $R_d$ are each independently selected from H, a $C_1$ to $C_4$ alkyl, an oxygen-containing, a nitrogen-containing and a sulphur-containing functional group. Where $R_a$ is aryl, the aryl is not a phenyl group having at least one hydrogen atom that has been substituted with a chlorine atom.

The present disclosure also relates to an ink jet ink set comprising a yellow ink, a cyan ink and a magenta ink as described herein.

It has been found that, by combining a quinacridone pigment with an azo pigment comprising at least one azo compound having the formula (I) above, it is possible to produce a magenta inkjet ink having improved red saturation.

As mentioned above, $R_a$ is selected from H, aryl and $C_1$ to $C_4$ alkyl. Where $R_a$ is a $C_1$ to $C_4$ alkyl, the alkyl may be methyl, ethyl, propyl or butyl. The term "aryl" is used herein to include any group derived from an arene or heteroarene by the removal of a hydrogen atom from a ring atom. For the avoidance of doubt, the aryl group may be unsubstituted or substituted. Where $R_a$ is an aryl, the aryl group may have 3 to 20 carbon atoms, for example, 5 to 10 carbon atoms. The aryl group may include fused ring system, for example, a phenyl ring fused to a cyclic, heterocyclic, aryl or heteroaryl ring. Where $R_a$ is an aryl, the aryl group may be phenyl, naphthyl or a benzimidazolyl. In an example, $R_a$ is selected from H, phenyl and benzimidazolyl.

Where $R_a$ is a substituted aryl, the aryl (e.g. phenyl or benzimidazolyl) group may be substituted with at least one group selected from a hydrocarbyl, oxygen-containing and nitrogen-containing functional groups. In one example, where $R_a$ is a substituted aryl, the aryl (e.g. phenyl or benzimidazolyl) group may be substituted with at least one group selected from oxygen-containing and nitrogen-containing functional groups. A combination of groups may be present. Suitable hydrocarbyl groups may include 1 to 20 carbon atoms, for example, 1 to 6 carbon atoms. Suitable oxygen-containing functional groups include oxo and ether functional groups. A suitable ether functional group is —OR, where $R_p$ is a $C_1$ to $C_4$ alkyl, for instance, methyl, ethyl, propyl or butyl. In one example, —OR$_p$ is —OCH$_3$ or OC$_2$H$_5$. Suitable nitrogen-containing groups include nitro, amine or amide groups. For avoidance of doubt, certain functional groups e.g. nitro or amide groups may be both nitrogen-containing groups and oxygen-containing groups. A group, for example, a sulfonyl group, may also be considered as an oxygen-containing group by virtue of the oxygen present. However, in one example, the only heteroatoms present in each of the oxygen- and nitrogen-containing groups are O and/or N.

In one example, $R_a$ is selected from H, a phenyl substituted with at least one group selected from ether and nitro, and 2,3-dihydro-oxo-1H-benzimidazol-5-yl.

Examples of suitable $R_a$ substituents include H,

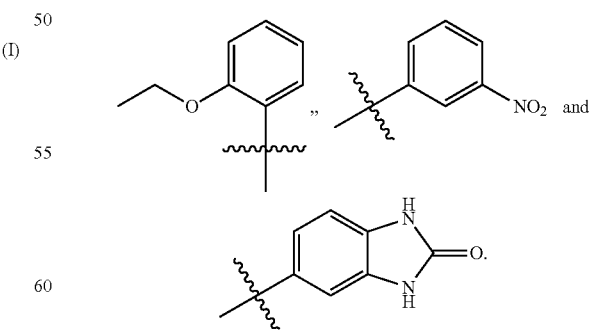

In one example, $R_a$ is H.

Where any one of $R_b$, $R_c$ and $R_d$ is a $C_1$ to $C_4$ alkyl, the alkyl may be methyl, ethyl, propyl or butyl, for instance, a methyl group. Where any one of $R_b$, $R_c$ and $R_d$ is an oxygen-containing functional group, suitable oxygen-containing functional groups include ether functional groups. Examples of suitable ether groups include —OR, where $R_p$ is a $C_1$ to $C_4$ alkyl, for instance, methyl, ethyl, propyl or butyl. In one example, —$OR_p$ is —$OCH_3$ or —$OC_2H_5$. Where any one of $R_b$, $R_c$ and $R_d$ is a nitrogen-containing group, suitable nitrogen-containing groups include nitro, amine or amide groups. Where any one of $R_b$, $R_c$ and $R_d$ is a sulphur-containing group, suitable sulphur-containing groups include sulfonyl, for example, aminosulfonyl. For the avoidance of doubt, some functional groups, such as amide and nitro groups may be both nitrogen- and oxygen-containing functional groups. Similarly, groups, such as, for example, aminosulfonyl may be both nitrogen-, sulphur- and oxygen-containing groups.

As mentioned above, $R_b$, $R_c$ and $R_d$ are each independently selected from H, a $C_1$ to $C_4$ alkyl, an oxygen-containing, a nitrogen-containing and a sulphur-containing functional group. In one example, $R_b$, $R_c$ and $R_d$ are each independently selected from H, a $C_1$ to $C_4$ alkyl, ether, amine, amide, nitro and sulfonyl groups. Examples of suitable $R_b$, $R_c$ and/or $R_d$ substituents include H, methyl, —$R_p$ (where, as mentioned above, $R_p$ is a $C_1$ to $C_4$ alkyl), —$OR_p$, —$CONH_2$, —$NO_2$, —$C(O)NHC_6H_5$ and —$S(O)_2NHCH_3$.

In one example, $R_b$ is —$R_p$ (where, as mentioned above, $R_p$ is a $C_1$ to $C_4$ alky, for example, methyl), —$OR_p$ or H. In one example, $R_b$ is —$OR_p$ or H. In one example, $R_b$ is selected from H, —$R_p$ and —$OR_p$; and $R_c$ and $R_d$ are each independently selected from hydrogen, methyl, an amide, a nitro and/or a sulfonyl group. For instance, $R_c$ and $R_d$ may each be independently selected from methyl, —$CONH_2$, —$NO_2$, —$C(O)NHC_6H_5$ and —$S(O)_2NHCH_3$.

In one example, at least one of $R_b$, $R_c$ and $R_d$ is not hydrogen.

As an example, the azo pigment may include a compound of the formula (IA) below as a pigment:

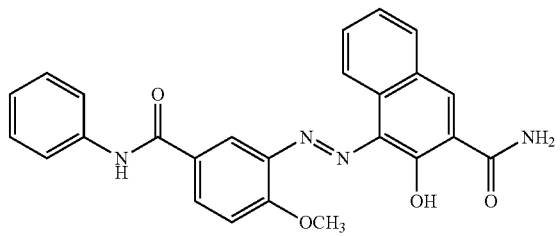
(IA)

An example of a suitable azo pigment is Pigment Red (PR) 150 or PR 213. PR150 and PR213 contain the azo pigment of the formula (IA) above.

As further examples, the azo pigment may contain a pigment selected from at least one of the following compounds:

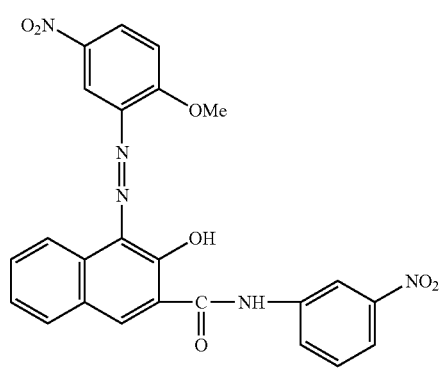
PR23

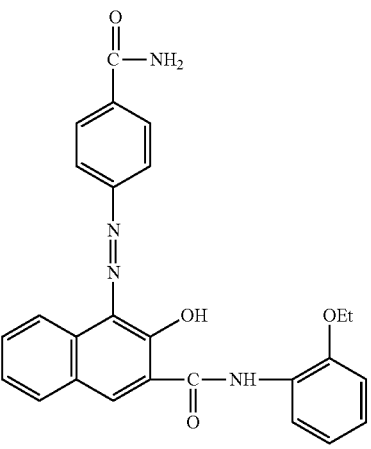
PR170

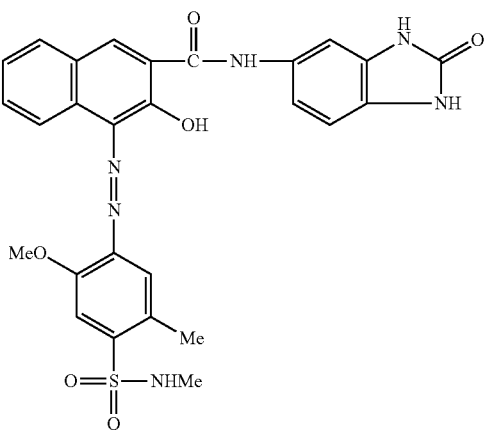
PR185

In one example, the azo pigment has an average particle size of 60 to 200 nm, for instance, 80 to 200 nm. In another example, the azo pigment has an average particle size of 90 to 150 nm. If one example, the azo pigment is milled to provide particles having an average particle size of 60 to 200 nm, for instance, 80 to 200 nm or 90 to 150 nm. The particle size of the azo pigment may be selected and tailored to optimize print performance such as image quality, decap and nozzle health.

Any suitable quinacridone ink may be employed. For example, the quinacridone pigment may comprise at least one compound having the formula (II),

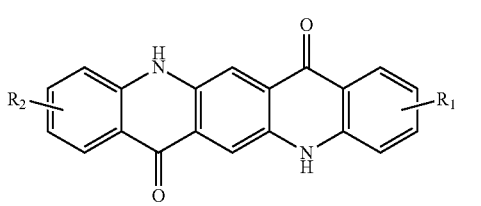
(II)

in which $R_1$ and $R_2$ are each independently selected from H, a halogen atom or a $C_1$ to $C_4$ alkyl group. Suitable halogen atoms include F, Cl, Br and I. In one example, the halogen atom is Cl. Suitable alkyl groups include methyl, propyl and butyl. In an example, the quinacridone pigment may comprise at least one pigment having the formula (II'),

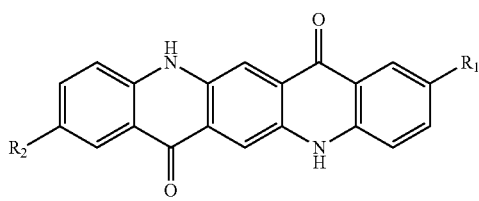

(II')

The R₁ and R₂ groups of the compounds (II) or (II') above may be each independently selected from at least one of H, Cl, methyl, ethyl, propyl or butyl group. In another example, R₁ and R₂ may be each independently selected from H, Cl or methyl. In yet another example, R₁ and R₂ are i) both methyl, ii) both Cl or iii) both H. In another example, one of R₁ and R₂ is methyl while the other is H.

In one example, the quinacridone pigment comprises at least one compound having the formula (IIA):

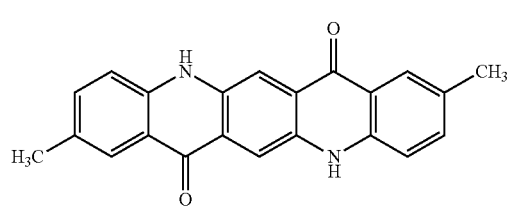

(IIA)

In another example, the quinacridone pigment comprises at least one compound having the formula (IB)

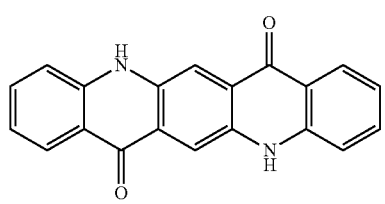

(IIB)

In an example, the quinacridone pigment comprises a pigment having the formula (IIC)

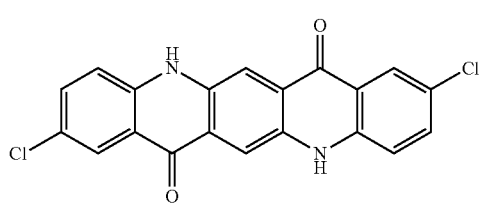

(IIC)

In yet another example, the quinacridone pigment comprises a pigment having the formula (IID)

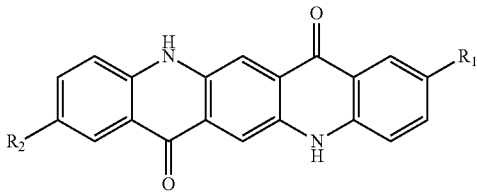

(IID)

where R₁ is H and R₂ is methyl.

In an example, the quinacridone pigment comprises at least one compound of the formulae (IIA), (IIB), (IIC) or (IID). In an example, the quinacridone pigment comprises two or more of compounds of the formulae (IIA), (IIB), (IIC) or (IID). In one example, the quinacridone pigment comprises a compound having the formula (IIA) in combination with a compound having the formula (IIB). In another example, the quinacridone pigment comprises a compound having the formula (IIA) in combination with a compound having the formula (IIB) and a compound having the formula (IID).

Suitable quinacridone pigments include PV19 (Formula IIB), PR202 (Formula IIC), PR282 (Formula IIA, B and D) and PR122 (Formula IIA). In one example, the quinacridone pigment is PR282 (Formula IIA, B and D), which contains a solid solution of PR122 (Formula IIA), PV19 (Formula IIB) and IID.

The quinacridone pigment may contain pigment formed of a single quinacridone compound. The quinacridone pigment may contain pigment formed of a mixture of two or more (e.g. 3) quinacridone compounds. The mixture may be a physical mixture or may be a solid solution. In one example, the quinacridone pigment is a solid solution of quinacridone pigment compounds having the formulae (IIA), (IIB) and (IID).

In an example, the azo pigment includes a pigment having a compound of the Formula (IA) and the quinacridone pigment includes a pigment having at least one compound selected from at least one of Formulae (IIA), (IIB), (IIC) and (IID). Where the azo pigment includes a pigment having a compound of the Formula (IA), the quinacridone pigment may include a pigment having two or more compounds selected from Formulae (IIA), (IIB), (IIC) and (IID). Where the azo pigment includes a pigment having a compound of the Formula (IA), the quinacridone pigment may include a pigment having at least one compound selected from Formulae (IIA), (IIB) and (IID), for example, a combination of compounds of Formulae (IIA), (IIB) and (IID).

In an example, the azo pigment may be PR150 or PR213 and the quinacridone pigment may be selected from at least one of Pigment Violet (PV)19, PR202, PR282 or PR122. In another example, the azo pigment may be PR150 or PR213 and the quinacridone pigment may be selected from PR122 or PR282.

In one example, the quinacridone pigment has an average particle size of 60 to 200 nm, for instance, 80 to 200 nm. In another example, the quinacridone pigment has an average particle size of 90 to 150 nm. In on example, the quinacridone pigment is milled to provide particles having an average particle size of 60 to 200 nm, for instance, 80 to 200 nm or 90 to 150 nm.

In one example, the weight ratio of quinacridone pigment to azo pigment within the range of 30-95:70-5. By tailoring the weight ratio of quinacridone to azo pigment within this range, an improvement in red saturation may be achieved while maintaining desirable ink properties including, for example, lightfastness. Furthermore, by including the azo pigment in the magenta ink, the waterfastness of the magenta ink may be maintained, for example, when compared to inks that include dyes. In one example, the magenta ink does not contain dye. It is also possible to maintain desirable decap properties by including the azo pigment employed in the magenta ink of the present disclosure. For example, this may allow the print nozzles to be uncovered and idle for a greater length of time without severely compromising their ability to print.

In one example, the weight ratio of quinacridone pigment to azo pigment may be quinacridone pigment to azo pigment may be 30-75:70-25. In one example, the weight ratio of quinacridone pigment to azo pigment may be 30-70:70-30. In another example, the weight ratio of quinacridone pigment to azo pigment may be 50-90:50-10, for instance, 50-85:50-15 or 50-70:50-30. In one example, the quinacridone pigment forms at least 50 weight %, for example, at least 60 weight % or at least 65 weight % of the total weight of quinacridone and azo pigment in the magenta ink. The azo pigment may form up to 50 weight %, for example, up to 40 weight % or up to 35 weight % of the total weight of quinacridone and azo pigment in the magenta ink. In yet another example, the weight ratio of quinacridone pigment to azo pigment may be 80-95:20-5, for instance, 85-90:15-10. The amount of azo pigment may be adjusted to improve the red saturation of the magenta ink without compromising on desirable ink properties including, for example, lightfastness. Furthermore, by including the azo pigment in the magenta ink, the waterfastness of the magenta ink may be maintained.

The quinacridone pigment may be present in the ink in an amount of 1 to 7 weight %, for example, 2 to 6 weight %. In one example, the quinacridone pigment is present in an amount of 2.5 to 5 weight %, for instance, 2.5 to 4.5 weight %.

The azo pigment may be present in the ink in an amount of 0.1 to 5 weight %, for example, 0.2 to 3 weight %. In one example, the azo pigment is present in an amount of 0.3 to 1.5 weight %.

As mentioned above, the quinacridone pigment and azo pigment are dispersed in a liquid vehicle. The magenta ink may be a dispersion comprising a quinacridone pigment and an azo pigment.

In one example, the magenta ink further comprises a binder. A suitable binder may be polyurethane. The polyurethane may be water-soluble. Polyurethane may be included in the magenta ink, for example, to improve the durability and/or scratch resistance of the printed ink. The binder, for example, polyurethane may be present in an amount of 0.05 to 5 weight % (active). In one example, the amount of polyurethane may be 0.1 to 2 weight % (active).

Without wishing to be bound by any theory, the addition of the polyurethane in the ink may improve durability. This may be at least partly because the polyurethane acts as an adhesive that binds the pigment particles together. In an example, the polyurethane binder is selected from polyurethane having a weight average molecular weight ranging from about 20,000 to 50,000. The polyurethane binder may have an acid number ranging from about 20 to 55. In another example, the polyurethane binder is selected from polyurethane having a weight average molecular weight ranging from about 40,000 to about 45,000, and an acid number ranging from about 50 to about 55.

The magenta ink may also include a solvent. Examples of solvents that may be used include a hydantoin alcohol (e.g. di-(2-hydroxyethyl)-5,5-dimethylhydantoin), 2-hydroxyethyl-2-pyrrolidinone, 1-(2-hydroxyethyl)-2-imidazolidinone, 2-hydroxyethylurea, 1,2,4-butanetriol, 2-pyrrolidone, triethylene glycol, 1,1,1-tris (hydroxymethyl) propane, tetraethylene glycol, 1,2,6-hexanetriol, glycerol, glycerol propoxylate, glycerol polyoxyethyl ether (LEG-1), 1,1,1-tris (hydroxymethyl) ethane and/or combinations thereof. In an example, the total amount of solvent(s) ranges from about 1 wt % to about 30 wt % of the total weight of the ink. In an example, the ink comprises 1 to 20 weight % di-(2-hydroxyethyl)-5,5-dimethylhydantoin, for example, 4.5 to 14 weight %.

The solvent or combination of solvents may interact with the binder (e.g. polyurethane), for example, to help to ensure that the binder (e.g. polyurethane) remains dispersed or dissolved in the magenta ink. This may reduce the risk of the binder (e.g. polyurethane) clogging, for example, the print nozzle during printing, thereby reducing the reliability of the ink. In one example, 1,1,1-tris (hydroxymethyl) ethane is employed as a solvent. Where employed, the 1,1,1-tris (hydroxymethyl) ethane may be employed in an amount of 1 to 20 weight %, for instance, 4-11 weight % of the magenta ink. In one example, the 1,1,1-tris (hydroxymethyl) ethane may be employed together with, for instance, a hydantoin alcohol (e.g. di-(2-hydroxyethyl)-5,5-dimethylhydantoin). In an example, the magenta ink comprises 1 to 20 weight % of di-(2-hydroxyethyl)-5,5-dimethylhydantoin and 1 to 20 weight % of 1,1,1-tris (hydroxymethyl) ethane. In another example, the magenta ink comprises 4.5 to 14 weight % of di-(2-hydroxyethyl)-5,5-dimethylhydantoin and 4 to 11 weight % of 1,1,1-tris (hydroxymethyl) ethane.

The magenta ink may also comprise surfactants. Non-ionic, anionic or cationic surfactants may be used. Some examples of suitable surfactants include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, phosphate esters, fluorosurfactants and mixtures thereof. The amount of surfactant(s) ranges from about 0.05 wt % to about 3.0 wt %. Examples of phosphate ester surfactants include surfactants that are commercially available under the tradename Emphos®, DeSophoS®, Hostaphat®, ESI-Terge®, EmuIgen®, Crodafos®, Dephotrope®, and DePhOS® which are available from Witco Corp. (Middlebury, Conn.), Clariant GmbH (Frankfurt, Germany), Cook Composites and Polymers Co., (Kansas City, Mo.), Kao Specialties Americas LLC (High Point, Nalco), Croda Inc. (Parsippany, N.J.), DeForest Enterprises, Inc. (Boca Raton, Fla.), and DeForest Enterprises, Inc. (Boca Raton, Fla.), respectively. Specific examples of phosphate ester surfactants that may be used include Crodafos® N-3 Acid, Emphos® 9NP, Emphos® CS121, Emphos® CS131, Emphos® CS141, Emphos® CS1361, HostaphaeLPKN, ESI-Terge® 320, ESI-Terge® 330, DePhoS® 8028, Emulgen® BL-2PK, DeSophos® 4P, DeSophoS® 6MPNa, DeSophoS®8DNP, DeSophoS® 9NP, DeSophoS® 30NP or Dephotrope® CAS-MF. In addition, mixtures of these phosphate ester surfactants may be used.

In an example the surfactants present are an acetylenic diol (e.g. those of the Surfynol® series available from Air Products (Lehigh Valley, Pa.)) and/or a phosphate ester (e.g. those of the Crodafos® series available from Croda In (Edison, N.J.)). In another example the surfactants present in the ink vehicle include Surfynol® SE-F in an amount of 0.05 to 1.5 wt % and Crodafos® O3A-LQ-(MH) in an amount of 0.05 to 1.5 wt %.

The magenta ink may further include one or more additives including, for example, biocide(s). The biocide(s) may be added to the ink vehicles to protect the inks from bacterial growth and fungi. The biocide(s) may be chosen from water-soluble biocides. In an example, the biocide(s) are present in an amount ranging from about 0.01 wt % to about 0.5 wt %.

In some instances the pH may have to be adjusted so that the pH falls within a desired range. In an example the pH ranges from about 8-11. In instances where the pH is lower than 8, the pH may be adjusted upwardly. In one example, an alkali may be used to adjust the pH to desired levels.

In an example, chelating agents may also be employed. Examples of chelating agents include 1,3-propylenediaminetetracecetic acid (PDTA-H4), diethylenetriaminepentaacetic acid (DPTA-H5) and Dissolvine® EDG. The chelating agent may be present in an amount of 0.01 to 0.5 weight % of the ink.

In an example, the liquid vehicle is an aqueous vehicle. The amount of water may be present in an amount ranging from about 60 wt % to about 90 wt % of the ink, for example, from about 70 to 85 weight % of the ink.

The magenta ink of the present disclosure may be used as part of an ink jet ink set that additionally comprises a yellow ink and a cyan ink. The yellow ink and cyan ink may each include a pigment dispersed in a liquid vehicle, for example, water.

The amount of water may be present in an amount ranging from about 60 wt % to about 90 wt % of the ink, for example, from about 70 to 85 weight % of the ink.

An example of the yellow ink includes a dispersed yellow pigment in an ink vehicle for the yellow ink. In an example, the yellow pigment is chosen from Pigment Yellow 74, Pigment Yellow 155, Pigment Yellow 213, or Pigment Yellow 128. The amount of the yellow pigment present in the yellow ink ranges from about 2 wt % to about 6 wt % of the entire weight of the yellow ink. In one example, the yellow ink includes a yellow pigment consisting essentially of a single compound.

An example of the cyan ink includes a dispersed cyan pigment in an ink vehicle for the cyan ink. In an example, the cyan pigment is chosen from Pigment Blue 15:3 or Pigment Blue 15:4. The amount of the cyan pigment present in the cyan ink ranges from about 1 wt % to about 4 wt % of the entire weight of the cyan ink. In one example, the cyan ink includes a cyan pigment consisting essentially of a single compound.

In addition to cyan, yellow and magenta, it is also possible for the ink set to include a black ink. A suitable black pigment is carbon black. The black pigment may be present in the black ink in an amount of 1.5 to 5 weight % of the entire weight of the black ink, for instance, 2.5 to 4 weight % of the entire weight of the black ink.

The yellow ink, the cyan ink and/or, where present, the black ink may also include a binder, solvent, surfactant, chelating agent and biocides. Examples of these components and their respective amounts are described above in relation to the magenta ink.

For example, the cyan, yellow and/or black ink may include a binder. A suitable binder may be polyurethane. The binder, for example, polyurethane may be present in an amount of 0.05 to 5 weight % (active). In one example, the amount of polyurethane may be 0.1 to 2 weight % (active), for instance, 0.2 to 1 weight % (active).

In an example, the polyurethane binder is selected from polyurethane having a weight average molecular weight ranging from about 20,000 to 50,000. The polyurethane binder may have an acid number ranging from about 20 to 55. In another example, the polyurethane binder is selected from polyurethane having a weight average molecular weight ranging from about 40,000 to about 45,000, and an acid number ranging from about 50 to about 55.

The cyan, yellow and/or black ink may also include a solvent. Examples of solvents that may be used include a hydantoin alcohol (e.g. di-(2-hydroxyethyl)-5,5-dimethylhydantoin), 2-hydroxyethyl-2-pyrrolidinone, 1-(2-hydroxyethyl)-2-imidazolidinone, 2-hydroxyethylurea, 1,2,4-butanetriol, 2-pyrrolidone, triethylene glycol, 1,1,1-tris (hydroxymethyl) propane, tetratethylene glycol, 1,2,6-hexanetriol, glycerol, glycerol propoxylate, glycerol polyoxyethyl ether (LEG-1), 1,1,1-tris (hydroxymethyl) ethane and/or combinations thereof. In an example, the total amount of solvent(s) ranges from about 1 wt % to about 30 wt % of the total weight of the ink. In an example, the ink comprises 1 to 20 weight % di-(2-hydroxyethyl)-5,5-dimethylhydantoin, for example, 4.5 to 14 weight %.

In one example, 1,1,1-tris (hydroxymethyl) ethane is employed as a solvent. Where employed, the 1,1,1-tris (hydroxymethyl) ethane may be employed in an amount of 1 to 20 weight %, for instance, 4-11 weight % of the ink. In one example, the 1,1,1-tris (hydroxymethyl) ethane may be employed together with, for instance, a hydantoin alcohol (e.g. di-(2-hydroxyethyl)-5,5-dimethylhydantoin). In an example, the ink comprises 1 to 20 weight % of di-(2-hydroxyethyl)-5,5-dimethylhydantoin and 1 to 20 weight % of 1,1,1-tris (hydroxymethyl) ethane. In another example, the ink comprises 4.5 to 14 weight % of di-(2-hydroxyethyl)-5,5-dimethylhydantoin and 4 to 11 weight % of 1,1,1-tris (hydroxymethyl) ethane.

The cyan, yellow and/or black ink may also comprise surfactants. Non-ionic, anionic and/or cationic surfactants may be used. Non-ionic, anionic or cationic surfactants may be used. Some examples of suitable surfactants include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, phosphate esters, fluorosurfactants and mixtures thereof. The amount of surfactant(s) ranges from about 0.05 wt % to about 3.0 wt %. Examples of phosphate ester surfactants include surfactants that are commercially available under the tradename Emphos®, DeSophoS®, Hostaphat®, ESI-Terge®, Emulgen®, Crodafos®, Dephotrope®, and DePhOS® which are available from Witco Corp. (Middlebury, Conn.), Clariant GmbH (Frankfurt, Germany), Cook Composites and Polymers Co., (Kansas City, Mo.), Kao Specialties Americas LLC (High Point, Nalco), Croda Inc. (Parsippany, N.J.), DeForest Enterprises, Inc. (Boca Raton, Fla.), and DeForest Enterprises, Inc. (Boca Raton, Fla.), respectively. Specific examples of phosphate ester surfactants that may be used include Crodafos® N-3 Acid, Emphos® 9NP, Emphos® CS121, Emphos® CS131, Emphos® CS141, Emphos® CS1361, HostaphaeLPKN, ESI-Terge® 320, ESI-Terge® 330, DePhoS® 8028, Emulgen® BL-2PK, DeSophos® 4P, DeSophoS® 6MPNa, DeSophoS®8DNP, DeSophoS® 9NP, DeSophoS® 30NP or Dephotrope® CAS-MF. In addition, mixtures of these phosphate ester surfactants may be used.

In an example the surfactants present are an acetylenic diol (e.g. those of the Surfynol® series available from Air Products (Lehigh Valley, Pa.)) and/or a phosphate ester (e.g. those of the Crodafos® series available from Croda In (Edison, N.J.)). In another example the surfactants present in the ink vehicle include Surrynol® SE-F in an amount of 0.05 to 1.5 wt % and Crodafos® O3A-LQ-(MH) in an amount of 0.05 to 1.5 wt %.

The cyan, yellow and/or black ink may further include one or more additives including, for example, biocide(s). The biocide(s) may be added to the ink vehicles to protect the inks from bacterial growth and fungi. The biocide(s) may be chosen from water-soluble biocides. In an example, the biocide(s) are present in an amount ranging from about 0.01 wt % to about 0.5 wt %.

In some instances the pH of the ink may have to be adjusted so that the pH falls within a desired range. In an example the pH ranges from about 8-11. In instances where the pH is lower than 8, the pH may be adjusted upwardly. In one example, an alkali may be used to adjust the pH to desired levels.

In an example, chelating agents may also be employed. Examples of chelating agents include 1,3-propylenediaminetetracecetic acid (PDTA-H4), diethylenetriaminepentaacetic acid (DPTA-H5) and Dissolvine® EDG. The chelating agent may be present in an amount of 0.01 to 0.5 weight % of the ink.

In an example, the liquid vehicle is an aqueous vehicle. The amount of water may be present in an amount ranging from about 60 wt % to about 90 wt % of the ink, for example, from about 70 to 85 weight % of the ink.

The examples of the inks and ink sets disclosed herein are pigment-based inks for inkjet printing. Printing may be accomplished via an inkjet printer, such as a thermal inkjet printer. It is believed that other inkjet printers may also be used, examples of which may include piezoelectric inkjet printers, other drop on demand inkjet printers, and/or continuous inkjet printers. The ink may be printed onto any suitable substrate including coated media (e.g. photo paper and brochure paper) and plain paper (e.g. colorlok and non-colorlok).

EXAMPLE 1

An ink jet ink set comprising a cyan ink, yellow ink and magenta ink was prepared as set out below:

Cyan Ink
2.0 wt % to 4 wt % cyan pigment
4.5 wt % to 14 wt % di-(2-hydroxyethyl)-5,5-dimethyl-hydantoin;
4 wt % to 11 wt % 1,1,1-tris (hydroxymethyl) ethane;
0.5 wt % to 1.5 wt % Surfynol® SE-F;
0.10 wt % to 1.5 wt % Crodafos® O3A-LQ-(MH);
0.01 wt % to 0.50 wt % biocides;
0.05 wt % to 0.50 wt % PDTA-H4;
0.10 wt % to 2.00 wt % binder (active) and
the balance water.
Yellow Ink
2.5 wt % to 4.5 wt % yellow pigment
4.5 wt % to 14 wt % di-(2-hydroxyethyl)-5,5-dimethyl-hydantoin;
4 wt % to 11 wt % 1,1,1-tris (hydroxymethyl) ethane;
0.5 wt % to 1.5 wt % Surfynol® SE-F;
0.10 wt % to 1.5 wt % Crodafos® O3A-LQ-(MH);
0.01 wt % to 0.50 wt % biocides;
0.05 wt % to 0.50 wt % PDTA-H4;
0.10 wt % to 2.00 wt % binder (active) and
the balance water.
Magenta Ink
2.5 wt % to 4.5 wt % quinacridone pigment
0.3 wt % to 1.5 wt % azo pigment
4.5 wt % to 14 wt % di-(2-hydroxyethyl)-5,5-dimethyl-hydantoin;
4 wt % to 11 wt % 1,1,1-tris (hydroxymethyl) ethane;
0.5 wt % to 1.5 wt % Surfynol® SE-F;
0.10 wt % to 1.5 wt % Crodafos® O3A-LQ-(MH);
0.01 wt % to 0.50 wt % biocides;
0.05 wt % to 0.50 wt % PDTA-H4;
0.10 wt % to 2.00 wt % binder (active) and
the balance water.

EXAMPLE 2

Magenta inks comprising of a total pigment load of 4.2% were prepared. The four inks were identical save for the nature and ratio of the magenta pigments employed.

Table 1 shows the red saturation values at a given hue angle of the 4 magenta inks printed on colorlok plain paper. As can be seen from the table, the red saturation increases as the level of PR150 is increased. By blending PR150 with PR282, it is possible to increase the red saturation of the magenta ink, while retaining desirable levels of magenta saturation.

TABLE 1

| Ratio of PR282:PR150 | Red Saturation on HPAiO |
|---|---|
| 100:0 | 1.04 |
| 90:10 | 1.12 |
| 70:30 | 1.16 |
| 0:100 | 1.33 |

EXAMPLE 3

Magenta inks comprising 4.5 weight % of pigment were prepared with the pigment blends shown in Table 2 below:

TABLE 2

| Example | Azo Pigment (50 wt % of total weight of pigment in the ink) | Quinacridone Pigment (50 wt % of total weight of pigment in the ink) |
|---|---|---|
| 3 | PR150 (contains compound of Formula IA above) | PR282 (contains compounds Formulae IIA and IIB and IID above) |
| 3C | PR269 (contains compound of Formula Z below) | PR282 (contains compounds Formulae IIA and IIB and IID above) |

The inks were printed on a variety of print media and the red saturation (C*/L*) of the magenta inks were determined (see Table 3). As can be seen from the results, improved C*/L* values were obtained in all instances using the PR150/PR282 blend.

TABLE 3

| Example | C*/L* on Oce Red Label (Non-colorlok plain paper) | C*/L* on HP Multi Purpose (Colorlok plain paper) | C*/L* on HP Web Press Coated Media |
|---|---|---|---|
| 3 | 0.95 | 1.21 | 1.49 |
| 3C | 0.82 | 1.16 | 1.40 |
| Magenta ink containing 4.5 weight % of PR282 | 0.81 | 1.01 | 1.20 |

Formula Z:

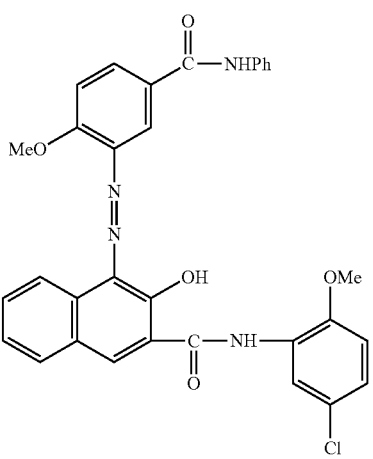

PR269

EXAMPLE 4

The decap properties of a magenta ink comprising PR150 and PR282 were determined. The weight ratio of PR150 to PR282 in the ink was 30:70. The decap properties were determined by determining the number of "spits" necessary to refresh the print nozzle after a decap time of 6 seconds. The decap properties of the ink were found to be significantly better than the decap properties of an identical ink formed by replacing the PR150 with an equal amount of PR269.

The invention claimed is:

1. A magenta inkjet ink comprising:
   an aqueous ink vehicle including from 1 to 20 weight % of 1,1,1- tris (hydroxymethyl) ethane and water;
   a quinacridone pigment; and
   an azo pigment comprising at least one azo compound having the formula (I):

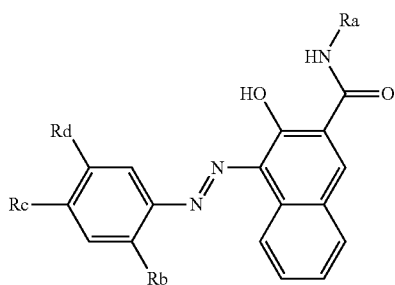

(I)

wherein $R_a$ is selected from H, aryl and $C_1$ to $C_4$ alkyl, and $R_b$, $R_c$, and $R_d$ are each independently selected from H, a $C_1$ to $C_4$ alkyl, an oxygen-containing, a nitrogen-containing and a sulphur-containing functional group;
   whereby, where $R_a$ is aryl, the aryl is not a phenyl group having at least one hydrogen that has been substituted with a chlorine atom.

2. The ink as claimed in claim 1, wherein $R_b$, $R_C$, and $R_d$ are each independently selected from H, a $C_1$ to $C_4$ alkyl, ether, amine, amide, nitro or sulfonyl group.

3. The ink as claimed in claim 1, wherein $R_a$ is selected from H, phenyl and benzimidazolyl.

4. The ink as claimed in claim 3, wherein $R_a$ is selected from H, a phenyl substituted with at least one group selected from ether and nitro, and 2,3-dihydro-oxo-1H-benzimidazol-5-yl.

5. The ink as claimed in claim 1, wherein the azo pigment comprises at least one compound having the formula (IA):

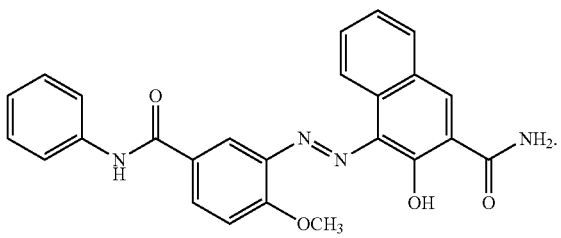

IA

6. The ink as claimed in claim 1, wherein the azo pigment has an average particle size of 80 to 200 nm.

7. The ink as claimed in claim 1, wherein the quinacridone pigment comprises at least one pigment having the formula (II),

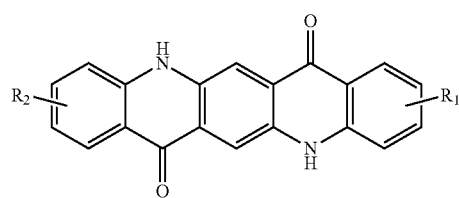

(II)

wherein $R_1$ and $R_2$ are each independently selected from H, a halogen atom or a $C_1$ to $C_4$ alkyl group.

8. The ink as claimed in claim 1, wherein the quinacridone pigment comprises a pigment selected from at least one of Formula (IIA), Formula (IIB), Formula (IIC) and Formula (IID):

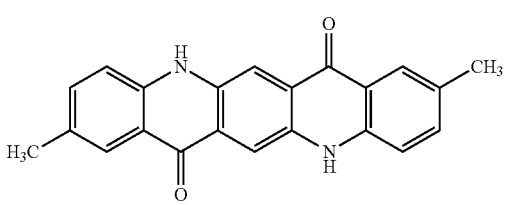

(IIA)

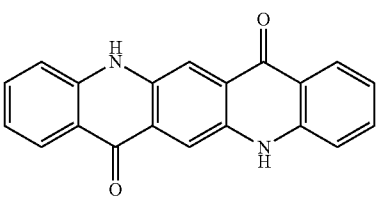

(IIB)

-continued

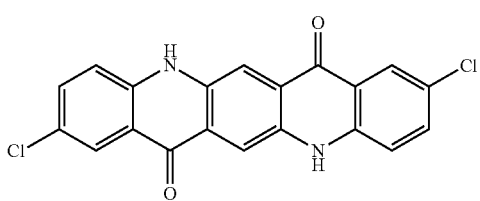
(IIC)

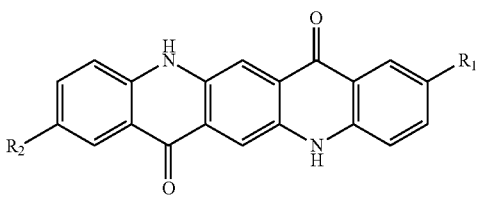
(IID)

where $R_1$ is H and $R_2$ is methyl.

9. The ink as claimed in claim 1, wherein the azo pigment comprises a compound of the Formula (IA) and the quinacridone pigment comprises a compound of the Formula (IIA), (IIB), (IID) or a combination of (IIA), (IIB) and (IID).

10. The ink as claimed in claim 1, wherein a weight ratio of the quinacridone pigment to the azo pigment is 30-95: 70-5.

11. The ink as claimed in claim 1, which further comprises 0.05 to 5 weight % polyurethane.

12. The ink as claimed in claim 1, wherein the aqueous vehicle further includes 1 to 20 weight % of a di-(2-hydroxyethyl)-5,5-dimethylhydantoin.

13. An ink jet ink set comprising:
a yellow ink,
a cyan ink, and
a magenta ink as claimed in claim 1.

14. An ink jet printing system comprising an ink jet ink set as claimed in claim 13.

15. A method of printing a print medium, said method comprising jetting the ink as claimed in claim 1 through a print nozzle onto a print medium.

16. The ink as claimed in claim 1, wherein a weight ratio of the quinacridone pigment to the azo pigment is 80-95: 20-5.

17. The ink as claimed in claim 1, wherein:
the quinacridone pigment is selected from the group consisting of Pigment Violet 19, Pigment Red 202, Pigment Red 282, and Pigment Red 122; and
the azo pigment is selected from the group consisting of Pigment Red 150 and Pigment Red 213.

18. The ink as claimed in claim 1, wherein the azo pigment is selected from the group consisting of Pigment Red 23, Pigment Red 170, Pigment Red 150 and Pigment Red 213.

* * * * *